(12) United States Patent
Williams

(10) Patent No.: US 11,122,781 B2
(45) Date of Patent: Sep. 21, 2021

(54) HEATER-EQUIPPED MAN-MADE BEEHIVE, AND METHOD FOR CONTROLLING INVASIVE PESTS IN A MAN-MADE BEEHIVE

(71) Applicant: Bee Hive Thermal Industries, LLC, Pageland, SC (US)

(72) Inventor: Lynn Williams, Pageland, SC (US)

(73) Assignee: Bee Hive Thermal Industries, LLC, Pageland, SC (US)

( * ) Notice: Subject to any disclaimer, the term of this patent is extended or adjusted under 35 U.S.C. 154(b) by 436 days.

(21) Appl. No.: 16/306,726

(22) PCT Filed: Jun. 1, 2017

(86) PCT No.: PCT/US2017/035415
§ 371 (c)(1),
(2) Date: Dec. 3, 2018

(87) PCT Pub. No.: WO2017/210410
PCT Pub. Date: Dec. 7, 2017

(65) Prior Publication Data
US 2019/0289830 A1    Sep. 26, 2019

Related U.S. Application Data

(60) Provisional application No. 62/344,112, filed on Jun. 1, 2016.

(51) Int. Cl.
*A01K 47/06* (2006.01)
*A01K 47/02* (2006.01)
*A01K 47/04* (2006.01)
*A01K 47/00* (2006.01)
*A01K 49/00* (2006.01)
*A01K 51/00* (2006.01)

(52) U.S. Cl.
CPC .............. *A01K 47/06* (2013.01); *A01K 47/00* (2013.01); *A01K 47/02* (2013.01); *A01K 47/04* (2013.01); *A01K 49/00* (2013.01); *A01K 51/00* (2013.01)

(58) Field of Classification Search
CPC ........ A01K 47/06; A01K 47/00; A01K 47/02; A01K 47/04; A01K 49/00; A01K 51/00; A01K 53/00; A01K 67/033; H05B 3/30; A61F 7/007
See application file for complete search history.

(56) References Cited

U.S. PATENT DOCUMENTS 2,506,118 A    5/1950  Taylor
3,994,034 A   11/1976  Van Damme et al.
(Continued)

FOREIGN PATENT DOCUMENTS

DE           3308017 C  *  3/1984  ............. A01K 51/00
DE   102006021144 B3  *  9/2007  ............. A01K 51/00
(Continued)

*Primary Examiner* — Kathleen I Alker
(74) *Attorney, Agent, or Firm* — Schwartz Law Firm, P.C.

(57) ABSTRACT

A heater-equipped man-made beehive incorporates a substantially enclosed hive body having a plurality of joined side walls, a floor, and a top. The hive body defines an entrance sufficient for allowing passage of bees into and from the beehive. A heating element is located inside the hive body adjacent the floor, and is adapted to raise an ambient temperature inside the beehive.

9 Claims, 4 Drawing Sheets

(56) References Cited

U.S. PATENT DOCUMENTS

| | | | | |
|---|---|---|---|---|
| 5,211,597 | A | * 5/1993 | Scott | ............ A01K 47/00 |
| | | | | 449/27 |
| 7,556,552 | B1 | * 7/2009 | Kemp | ............ A01K 47/06 |
| | | | | 449/1 |
| 2012/0202403 | A1 | 8/2012 | Sinanis et al. | |
| 2014/0134920 | A1 | 5/2014 | Linhart | |
| 2016/0212976 | A1 | * 7/2016 | Bulanyy | ............ A01K 47/06 |
| 2017/0064931 | A1 | * 3/2017 | Tagliaferri | ............ A01K 47/04 |

FOREIGN PATENT DOCUMENTS

| | | | | | |
|---|---|---|---|---|---|
| DE | 202015107038 | U1 | * | 4/2016 | ............ A01K 51/00 |
| EP | 2789227 | A1 | * | 10/2014 | ............ A01M 1/22 |
| KR | 890003038 | Y1 | * | 5/1989 | ............ A01K 51/00 |
| KR | 20120000773 | U | * | 2/2012 | ............ A01K 1/0158 |
| KR | 20120031324 | A | * | 4/2012 | ............ A01K 49/00 |
| WO | WO-8908372 | A1 | * | 9/1989 | ............ H05B 3/688 |
| WO | 2010/098853 | A1 | | 9/2010 | |
| WO | WO 2010/098853 | A1 | | 9/2010 | |

* cited by examiner ized to correspond substantially to an interior dimension of the hive body. For example, if an interior length and width dimension of the hive body is 18 inches×14 inches, then the total surface area of the top plate residing inside the hive body may be 200 square inches or more—or between 200 and 252 square inches.
HEATER-EQUIPPED MAN-MADE BEEHIVE, AND METHOD FOR CONTROLLING INVASIVE PESTS IN A MAN-MADE BEEHIVE

TECHNICAL FIELD AND BACKGROUND OF THE DISCLOSURE

The present disclosure relates broadly and generally to heater-equipped man-made beehive, and method for controlling invasive pests in a made-made beehive.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a heater-equipped man-made beehive. The beehive comprises a base, and a substantially enclosed hive body carried on the base and having a plurality of joined side walls, a floor, and a top. The top of the hive body may be closed directly by a removable lid, or indirectly through other vertically-stacked hive structure. The hive body defines a slotted entrance along a bottom edge of one of the side walls. The entrance is sufficient to allow passage of bees into and from the beehive. A low-profile heating tray is substantially inserted through the slotted entrance of the hive body, and resides adjacent the floor of the hive body. In one embodiment, the heating tray covers greater than ¾ of the floor surface area. The heating tray comprises an electric heating element, and a heat-conductive material designed to distribute heat generated by the heating element across a surface area of the heating tray.

According to another exemplary embodiment, an electronic temperature controller is operatively connected to the heating element.

According to another exemplary embodiment, the temperature controller is located outside of the hive body, and is mounted at (or depends from) a front edge of the heating tray.

According to another exemplary embodiment, a corded temperature probe is connected to the temperature controller and has a free end inserted through a hole formed in the hive body. The temperature probe measures ambient temperature inside the hive body.

According to another exemplary embodiment, the heating element comprises a flexible rubber (e.g., silicone) heating pad with an integrated heating wire.

According to another exemplary embodiment, the heating tray comprises overlying metal (e.g., aluminum) plates defining a thermally conductive pocket for receiving and holding the heating pad. The top plate may be sized to correspond substantially to an interior dimension of the hive body. For example, if an interior length and width dimension of the hive body is 18 inches×14 inches, then the total surface area of the top plate residing inside the hive body may be 200 square inches or more—or between 200 and 252 square inches.

According to another exemplary embodiment, the heating tray further comprises a temperature sensor for measuring the surface temperature of the metal plates.

According to another exemplary embodiment, the man-made beehive includes at least one stacked super located adjacent the hive body.

According to another exemplary embodiment, a gravity drip bucket feeder is carried on a perforated lid of the beehive.

In yet another exemplary embodiment, the present disclosure comprises a heater-equipped man-made beehive incorporating a substantially enclosed hive body having a plurality of joined side walls, a floor, and a top. The hive body defines an entrance sufficient for allowing passage of bees into and from the beehive. A heating element is located inside the hive body adjacent the floor, and is adapted to raise an ambient temperature inside the beehive.

In yet another exemplary embodiment, the disclosure comprises a method for controlling invasive pests in a man-made beehive. The method includes locating a heating tray inside the beehive, such that the heating tray resides adjacent a floor of a hive body. The heating tray is activated to raise an ambient temperature inside the hive body to greater than 100 degrees Fahrenheit. The ambient temperature inside the hive body is maintained above 100 degrees Fahrenheit for a predetermined treatment cycle. After the treatment cycle, the heating tray is de-activated to reduce the ambient temperature inside the hive body.

According to another exemplary embodiment, the treatment cycle has a duration greater than 120 minutes.

According to another exemplary embodiment, the treatment cycle has a duration less than 180 minutes.

According to another exemplary embodiment, the treatment cycle has a duration between 120 and 180 minutes.

According to another exemplary embodiment, the method includes insulating the beehive prior to the treatment cycle.

According to another exemplary embodiment, the method includes performing at least three treatment cycles annually.

According to another exemplary embodiment, a single treatment cycle occurs in each of the spring, summer, and fall seasons.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
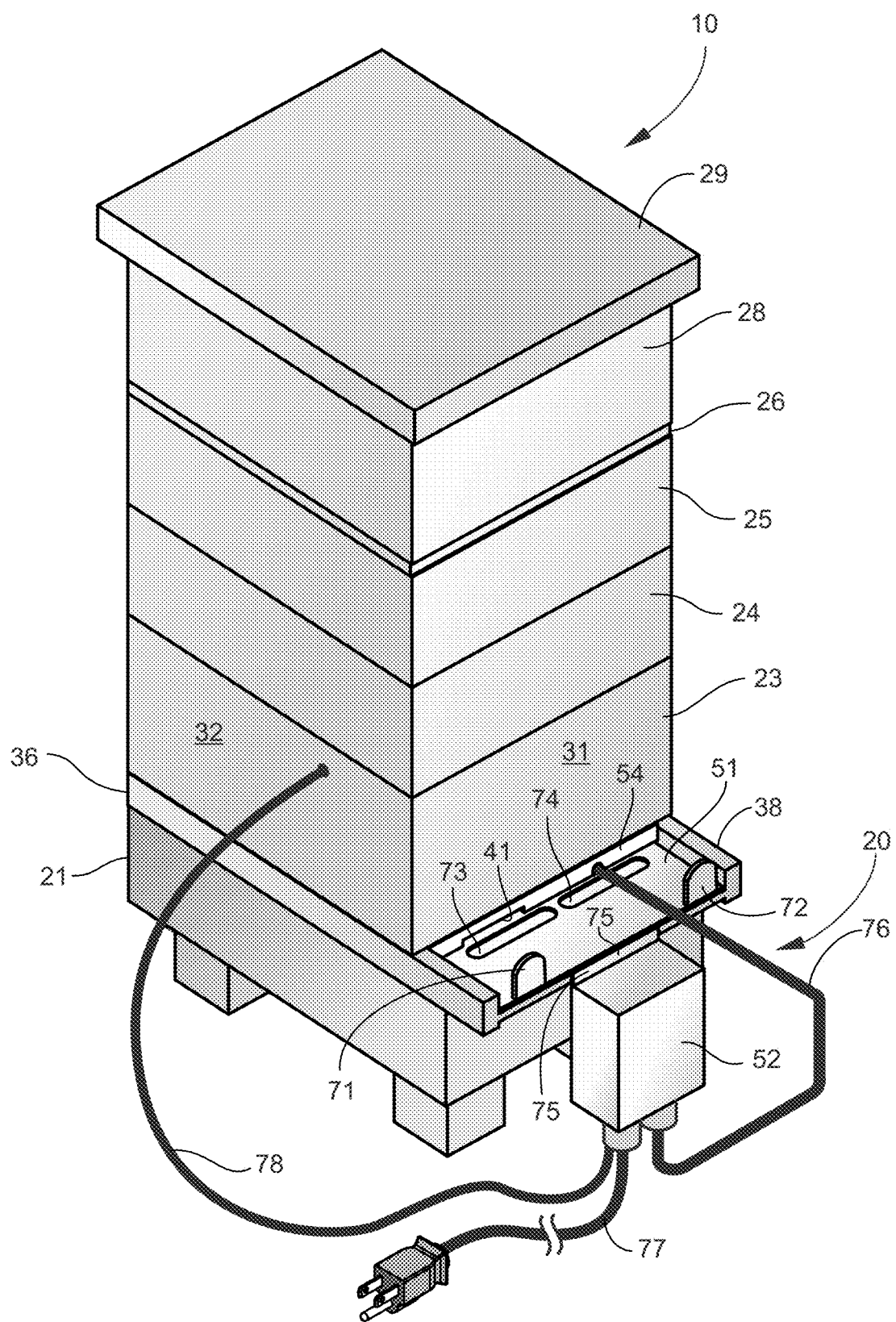
FIG. 1 is a perspective view of a heater-equipped man-made beehive according to one exemplary embodiment of the present disclosure.

Referring now specifically to the drawings, a heater-equipped man-made beehive according to one exemplary embodiment of the present disclosure is illustrated in FIG. 1, and shown generally at broad reference numeral 10. The exemplary beehive 10 incorporates a programmable thermal system 20 utilized to control ambient temperature inside the beehive 10. The present thermal system 20 may be incorporated in beehive 10, as shown and described herein, or may be utilized in any conventional pre-existing hive structure as a retrofit component. In one implementation discussed further below, the present beehive 10 may be heated for periodic treatment cycles to kill or control the presence of invasive pests, such as the *Varroa destructor* parasite (*Varroa* mite) and the small hive beetle Aethinatumida (SHB). In other implementations, the exemplary thermal system 20 may be utilized to maintain a sufficiently warm and generally consistent temperature inside the beehive 10 (e.g., at or about 92 degrees F.)—particularly during cold winter months.

Figure 2:
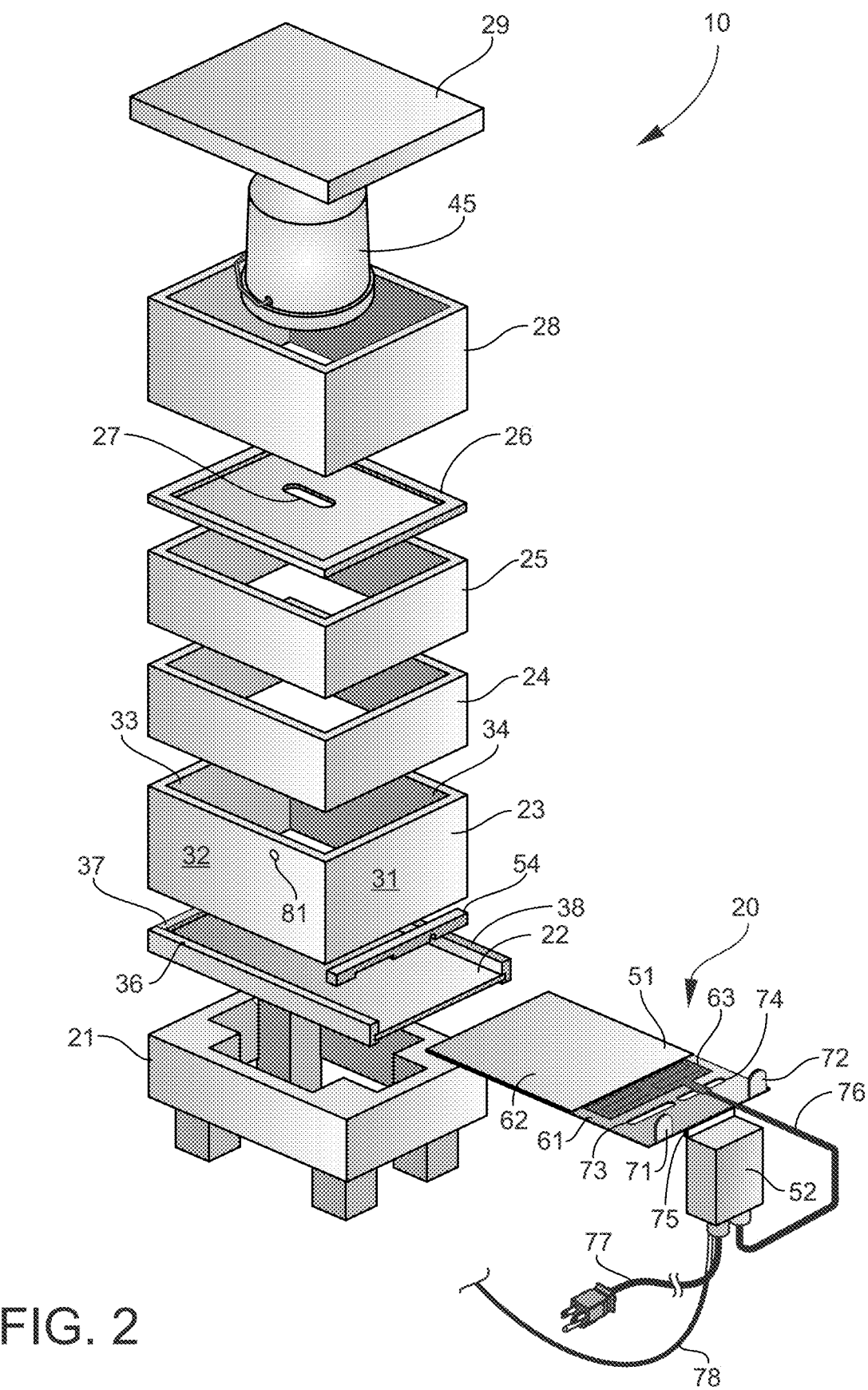
FIG. 2 is an exploded perspective view of the present man-made beehive.

Referring to FIGS. 1 and 2, the exemplary beehive 10 is mounted on a wooden base 21 (or pedestal), and comprises an assembly of stacked wooden boxes and other hive structure including: a solid-surface floor board 22, a hive body 23 located on the floor board 22, stacked honey supers 24, 25 located on the hive body 23, an inner cover 26 defining a central feed opening 27, a feeder box 28, and a solid-surface outer cover 29. The box-shaped hive body 23 is constructed of joined side walls 31, 32, 33, and 34, and is sized to mount directly on raised perimeter flanges 36, 37, and 38 of the floor board 22. The front of the floor board 22 is open, and cooperates with a bottom edge of side wall 31 to define a slotted entrance 41 sufficient to allow passage of bees into and from the beehive 10. The joined side walls 31-34 of the hive body 23 form an open top onto which the honey supers 24, 25 are stacked. The honey supers 24, 25 are standard in the industry, and may be shallow, medium or deep sizes. As commonly known and understood in the art, each honey super 24, 25 may contain 8-10 frames (not shown) used to collect honey. Western honeybees collect nectar and store the processed nectar in the honeycomb of the frames. When the honeycomb is full, beekeepers will take the honey supers and extract the honey. During a honey flow, beekeepers may put several honey supers onto a hive so the bees have enough storage space. Honey supers are removed in the fall when the honey is extracted and before the hive is winterized.

Figure 4:
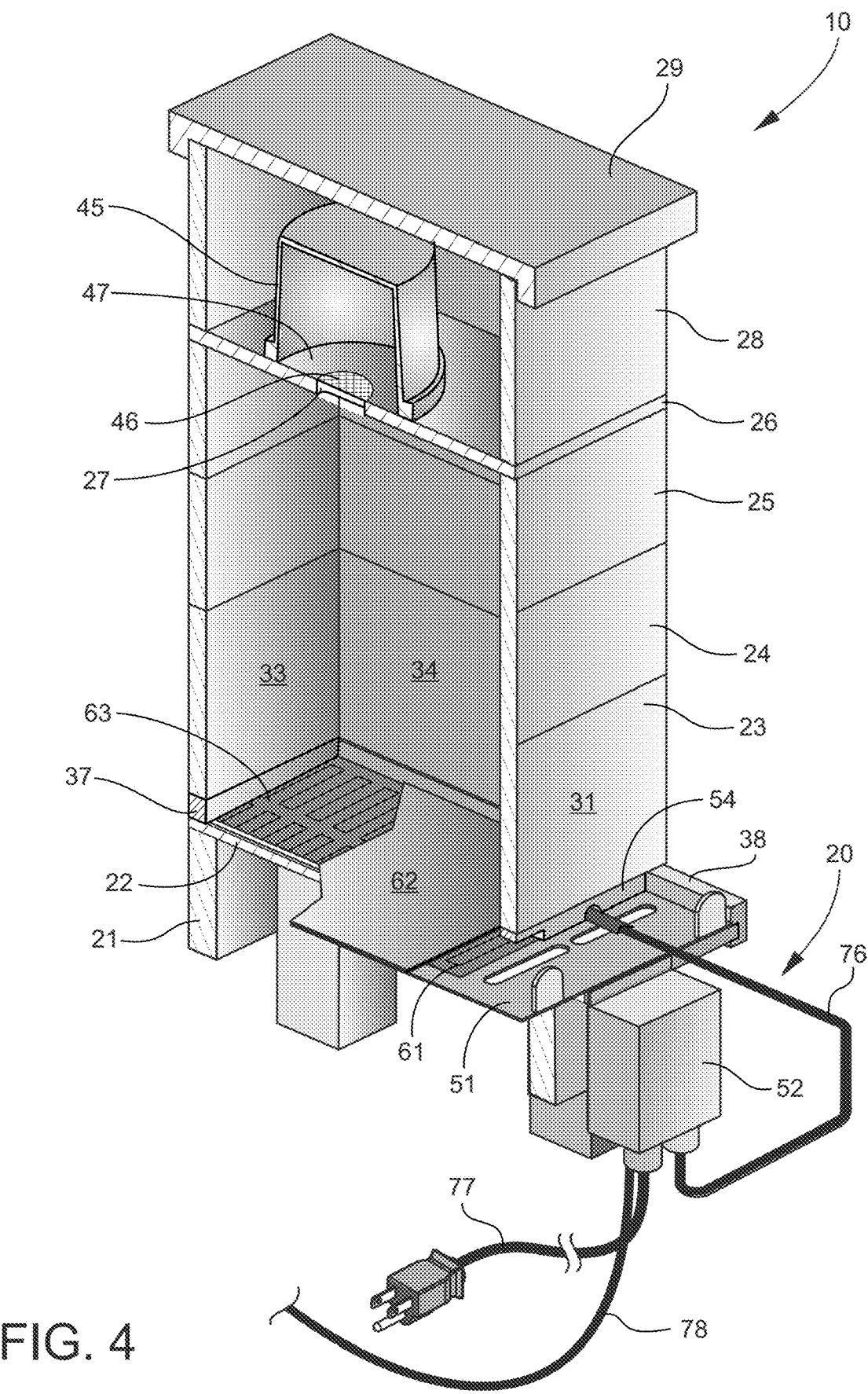
FIG. 4 is a cross-sectional view of the present man-made bee hive.

As best shown in FIGS. 2 and 4, the inner cover 26 resides atop the honey super 25 and carries an inverted bucket feeder 45 containing a syrupy mixture of sugar and water. The bucket feeder 45 is located inside the feeder box 28, and has a number of small holes 46 formed in the bucket lid 47 and aligned with the feed opening 27 of the inner cover 26. The small holes 46 allow the syrupy mixture to slowly drip from the bucket feeder 45 through the stacked honey supers 24, 25 to the hive body 23. The outer cover 29 is placed on top of the feeder box 28, and is removable for ready access to the bucket feeder 45. The entire beehive assembly described above may be integrally joined together in substantial vertical (stacked) registration using nails, screws, glue, and other fastener means.

Beehive Thermal System 20

In one exemplary embodiment, the thermal system 20 incorporated in the present man-made beehive 10 comprises a removable heating tray 51 and a digital (or mechanical) temperature controller 52. The exemplary heating tray 51 is designed to conveniently slide into and out of the slotted front entrance 41 of the beehive 10, and has a sufficiently low profile to avoid obstructing the passage of bees into and from the hive body 23. Under certain circumstances, an optional entrance reducer 54 may be positioned at the slotted entrance 41 to limit the movement of bees into and from the hive 10.

Figure 3:
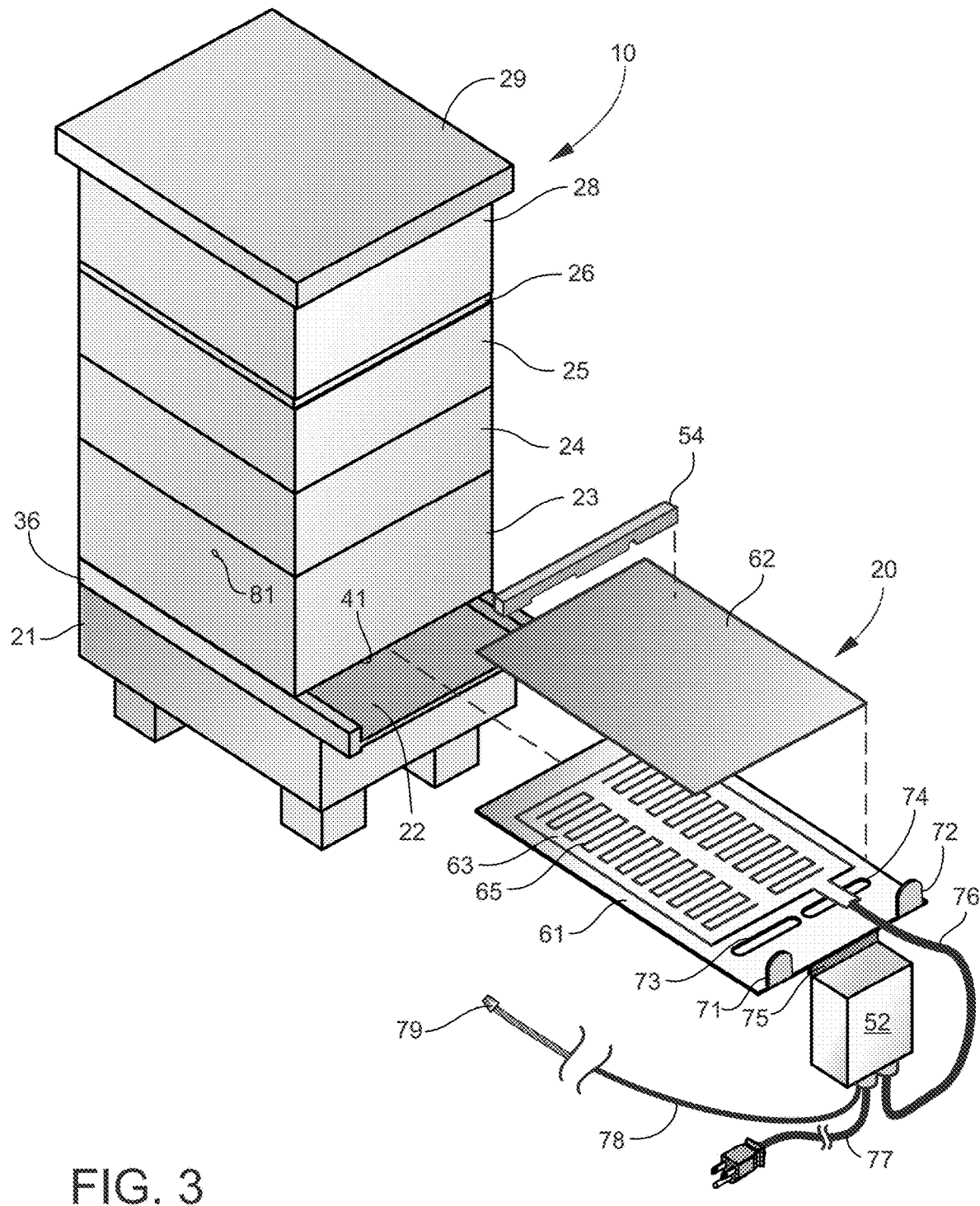
FIG. 3 is a further perspective view the man-made beehive with the thermal system removed from the slotted front entrance.

Referring to FIGS. 3 and 4, the exemplary heating tray 51 comprises a relatively large planar bottom plate 61 and a smaller planar top plate 62 cooperating to form a conductive pocket for receiving and holding an electric heater pad 63.

Both plates 61, 62 may be entirely fabricated of a thin metal, such as aluminum, or other thermally-conductive material. The metal bottom plate 61 covers a substantial portion of the floor board 22 and extends outwardly from the front entrance 41 of the beehive 10, as best shown in FIG. 1. The metal top plate 62 may be sized to correspond substantially to an interior dimension of the hive body 23, such that heat generated by the electric heater pad 63 is conducted across the surface area of the top plate 62 and relatively uniformly distributed throughout the beehive 10. The exemplary heater pad 63 comprises a metal wire heating element 65 laminated between two layers of 20 mil fiberglass-reinforced silicone rubber, and having a power density of 2.5 watts/sq in (0.004 watts/sq mm) and an exposure temperature range of −60° F. to 450° F. (−51° C. to 232 C). The exemplary heater pad 63 may also be moisture, chemical, and radiation resistant.

The present heating tray 51 may further comprise upwardly-turned ears 71, 72 and hand openings 73, 74 to facilitate handling, and a downward-extending mounting flange 75 along its front edge for carrying the electronic temperature controller 52. The temperature controller 52 resides outside of the hive body 23, and is connected to the heater pad 63 through electrical cord 76 and to a power source through outdoor power cord 77. The temperature controller 52 comprises a microprocessor (not shown) and other circuit board components applicable for sensing and automatically regulating temperature of the heater pad 63. A corded temperature probe 78 operatively connects to the temperature controller 52, and has a distal sensor end 79 which inserts through a small hole 81 in the hive body 23 to sense and measure ambient temperature inside the beehive 10. In one exemplary application, the temperature probe 78 functions in a manner similar to a conventional thermostat causing the controller 52 to activate the electric heater pad 63 when the ambient temperature inside the hive 10 drops to a predetermined threshold. In this manner, the interior temperature of the beehive 10 may be constantly monitored and maintained at a predetermined level (e.g., about 92 degrees F.) throughout the winter season.

In a further exemplary implementation, the beehive thermal system 20 may be utilized in a method for controlling invasive pests inside the beehive 10, such as *Varroa* mites and small hive beetles mentioned above. In the present method, prior to pest treatment all ventilation openings and seams in the beehive 10 may be sealed using removable foam tape or other suitable insulation. The heating tray 51 is then activated during a pest treatment cycle to raise and maintain the ambient temperature inside the hive body 23 to greater than 100 degrees F.—e.g., about 106 degrees F. Once the ambient temperature reaches 106 degrees F. (the "treatment temperature"), a single treatment cycle may last for between 120 and 180 minutes at this maintained temperature. In one embodiment, each treatment cycle lasts 160 minutes. After the treatment cycle is completed, the ventilation openings are uncovered and the heating tray 51 is de-activated to reduce the ambient temperature inside the hive body 23 back to its normal maintenance temperature—e.g., about 92 degrees F. In one example, the treatment cycles may be performed at least three times annually; once in each of the spring, summer, and fall seasons.

In alternative embodiments (not shown), the exemplary man-made beehive may incorporate a flexible thermal blanket designed to wrap 360-degrees around an exterior of the hive box. The thermal blanket may be battery-powered, and may operatively connect to a solar panel for charging. The thermal blanket functions to maintain a constant ambient temperature of about 92 degrees F. to promote a large healthy hive.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112(f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. A heater-equipped man-made beehive, comprising:
    a base;
    a substantially enclosed hive body carried on said base and comprising a plurality of joined side walls, a floor, and a top;
    said hive body defining a slotted entrance along a bottom edge of one of said side walls, and said entrance being sufficient to allow passage of bees into and from said beehive; and
    a heating tray substantially inserted through the slotted entrance of said hive body and residing adjacent the floor of said hive body, and said heating tray comprising a relatively large planar bottom plate and a smaller planar top plate, said bottom and top plates cooperating to form a conductive pocket, and an electric heater pad inserted through an opening of said conductive pocket to reside between said top and bottom plates, and said heater pad comprising an electric heating element and a heat-conductive material designed to distribute heat generated by said heating element across a surface area of said top plate of said heating tray, and wherein a front edge of said bottom plate of said heating tray extends outwardly from the slotted entrance of said hive body and comprises an outwardly turned mounting flange; and an electronic temperature controller operatively connected to said heating element and attached to said mounting flange of said bottom plate to reside outside of said hive body.

2. The man-made beehive according to claim 1, and comprising a corded temperature probe connected to said temperature controller and having a free end inserted through a hole formed in said hive body.

3. The man-made beehive according to claim 1, wherein said electric heater pad comprises a flexible rubber heating pad with an integrated heating wire.

4. The man-made beehive according to claim 1, wherein said heating tray further comprises a temperature sensor.

5. The man-made beehive according to claim 1, and comprising at least one stacked super located adjacent said hive body.

6. The man-made beehive according to claim 1, and comprising a gravity drip bucket feeder carried on a perforated lid of said beehive.

7. A heater-equipped man-made beehive, comprising:
   a substantially enclosed hive body comprising a plurality of joined side walls, a floor, and a top;
   said hive body defining an entrance sufficient for allowing passage of bees into and from said beehive; and
   a heating tray substantially inserted through the entrance of said hive body and residing adjacent the floor of said hive body, and said heating tray comprising a relatively large planar bottom plate and a smaller planar top plate, said bottom and top plates cooperating to form a conductive pocket, and an electric heater pad inserted through an opening of said conductive pocket to reside between said top and bottom plates, and said heater pad comprising an electric heating element and a heat-conductive material designed to distribute heat generated by said heating element across a surface area of said top plate of said heating tray, and wherein a front edge of said bottom plate of said heating tray extends outwardly from the entrance of said hive body and comprises an outwardly turned mounting flange; and
   an electronic temperature controller operatively connected to said heating element and attached to said mounting flange of said bottom plate to reside outside of said hive body.

8. The man-made beehive according to claim 7, and comprising a corded temperature probe connected to said temperature controller and having a free end inserted through a hole formed in said hive body.

9. The man-made beehive according to claim 7, wherein said electric heater pad comprises a flexible rubber heating pad with an integrated heating wire.

* * * * *